Sept. 30, 1958          A. H. BENGEYFIELD          2,853,804
                          TIME TEACHING DEVICE
                          Filed July 29, 1954
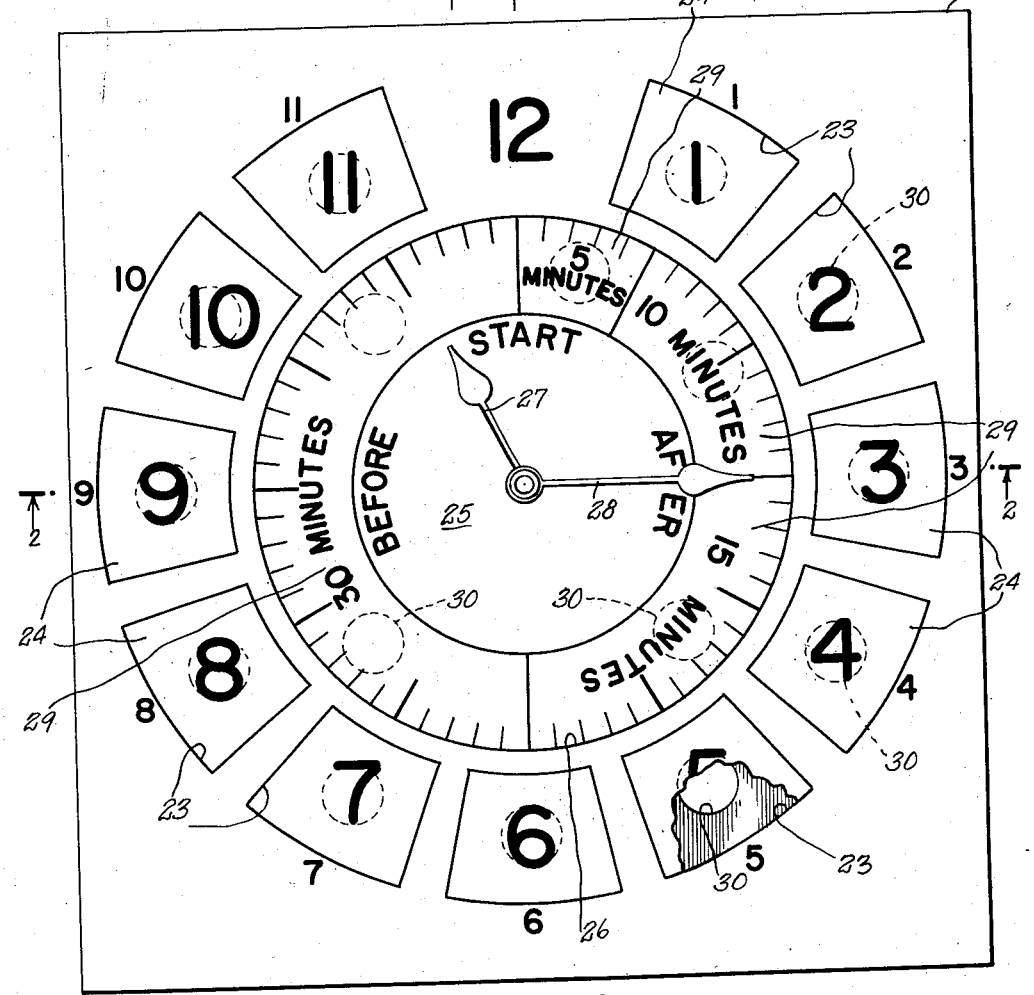
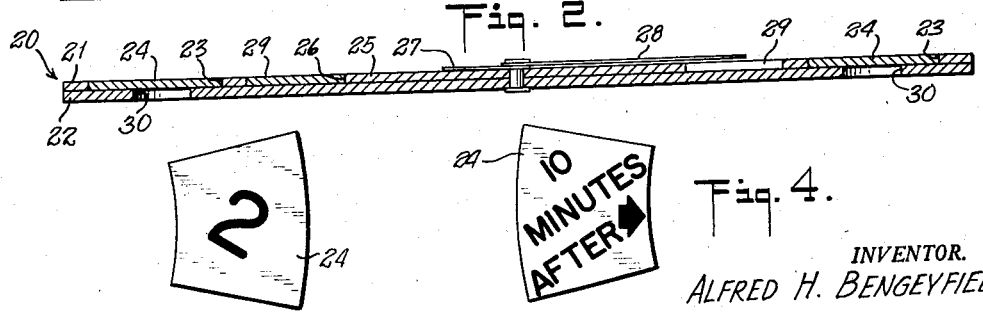
INVENTOR.
ALFRED H. BENGEYFIELD
BY Leo C. Kraginski
ATTORNEY

United States Patent Office 2,853,804
Patented Sept. 30, 1958

2,853,804
TIME TEACHING DEVICE

Alfred H. Bengeyfield, Williston Park, N. Y.

Application July 29, 1954, Serial No. 446,479

6 Claims. (Cl. 35—39)

The present invention relates to educational devices and, more particularly, to a toy for teaching children how to read time.

Accordingly, an object of the present invention is to provide a toy which simulates a clock and includes a number of members which are removably mounted and can be replaced in other positions to measure or indicate time intervals.

Another object is to provide such a toy wherein certain of the members are reversible and are referenced on one side to the hour hand of the clock and on the opposite side to the minute hand of the clock.

Another object is to provide such a toy which is self checking.

Another object is to provide such a toy having means for facilitating removal of the members.

A further object is to provide such a toy which is simple and compact in construction and is economical to manufacture.

Other and further objects will be obvious upon an understanding of the illustrative embodiment about to be described, or will be indicated in the appended claims, and various advantages not referred to herein will occur to one skilled in the art upon employment of the invention in practice.

Fig. 1 is a plan view of a toy in accordance with the present invention, the removable members being shown in their normal positions.

Fig. 2 is a sectional view taken along the line 2—2 in Fig. 1.

Fig. 3 is a plan view of a reversible member removed from the toy, illustrating the side referenced to the hour hand of the clock.

Fig. 4 is a plan view of the device shown in Fig. 3, illustrating the opposite side thereof which is referenced to the minute hand of the clock.

Referring to the drawing in detail and more particularly to Figs. 1 and 2 thereof, a time teaching toy is shown comprising a board 20 formed for convenience of manufacture of an upper sheet 21 and a lower sheet 22 secured to each other.

The upper sheet has a plurality of openings or recesses 23 therein arranged in an annular zone and each spaced equidistantly from an adjacent opening. Eleven of such openings are provided with an opening each at the one o'clock to eleven o'clock positions of a clock-face, respectively, and the corresponding numerals referenced to the hours of one to eleven at the outer side of each recess. The twelve o'clock position is marked "start" and no opening is provided thereat but the numeral twelve appears at that position.

The openings 23 are each adapted to receive a member 24 which is removable and replaceable. These members are designated as the reversible members herein and are referenced to the hour hand of a clock by having applied on one side thereof hour numerals from one to eleven, respectively. The correct positions for the members 24 are indicated by the numerals adjacent the recesses 23. The other side of these members is referenced to the minute hand of a clock by having applied thereon legend designating the number of minutes after or before the hour at the respective hourly positions.

For example, as shown in Figs. 3 and 4, the member for the two o'clock opening has "10 minutes after" on the side opposite the side bearing the numeral two. Similarly, although not shown, the underside of the one o'clock, three o'clock, four o'clock, five o'clock, six o'clock, seven o'clock, eight o'clock, nine o'clock, ten o'clock, and eleven o'clock members, respectively, may have thereon the legend "five minutes after," "fifteen minutes after" and/or "quarter past," "twenty minutes after," "twenty-five minutes after," "thirty minutes after" and/or "half past," "twenty-five minutes before," "twenty minutes before," "fifteen minutes before" and/or "quarter of," "ten minutes before," and "five minutes before." When the members 24 are arranged as shown in Fig. 1 with the numerals thereon facing upwardly, the annular zone in which they are arranged represents a clock-face.

The upper sheet 21 further has a circular opening concentrically arranged within the aforementioned annular zone. A circular disc 25 is secured to the lower sheet and is centrally disposed in the circular opening to provide an annular recess 26. An hour hand 27 and a minute hand 28 are rotatively mounted at the center of the disc 25 with the minute hand extending at least partially across the annular recess.

In accordance with the present invention, the annular recess 26 is adapted to have a plurality of segments positioned therein which divide the clockface into a variable number of minutes and serve as a means for illustrating the time of the day at one time to another time after a certain number of minutes of time. When these segments are placed in the recess 26 side by side or end to end, in their normal position, they fill the recess completely.

For example, as illustrated herein, four annular segments or arcuate members 29 may be provided, each being of a length or width and extending circumferentially for a portion of 360° to respectively simulate an elapse of time equivalent to five, ten, fifteen and thirty minutes. This arrangement provides for any combination, at five minutes intervals, from five to sixty. The members 29 may further be marked to simulate the minute markings of a clock-face, with each fifth minute being indicated by a more pronounced mark.

In order to facilitate removal of the members 24 and 29, the lower sheet has an aperture 30 for each of these members, which aperture faces the member and communicates with the recess or opening in which the member is disposed, whereby a finger or suitable implement may be inserted through these apertures from underneath to push out the selected members.

In use, the toy may be utilized to determine and check the time set on the simulated clock-face in the manner about to be described. For example, the hour hand 27 is pointed to twelve o'clock and the minute hand 28 is pointed to eight o'clock. The four segments 29 are then removed and the device is given to the child. The child then tries to find the segment or segments to fill the recess 26 from the word "start" (at twelve o'clock) in a clockwise direction to the position of the minute hand. In this example, the child would find that the thirty minute segment and the ten minute segment would correctly measure this annular distance representing elapsed time. This would inform the child that it is forty minutes after the hour. In order for the child to check and see what the correct time is, the child removes the member 24 (marked 8) at the minute hand location and, upon turning over this member, finds that it is twenty minutes before the hour. Thus, the child has the check and complete story that forty minutes after is twenty minutes before the next hour. It will be understood that the segments 29 can be utilized to work out any given time on the face of the clock.

From the foregoing description, it will be seen that the present invention provides an educational toy which enables children to be taught and also teach themselves how to determine the correct time of the day by observing a clock. The manipulations afforded by the toy make it much easier for the child to learn than just by observation.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

I claim:

1. An educational toy comprising a board formed of an upper sheet and a lower sheet secured to each other, said upper sheet having an annular zone simulating a clock-face and having a circular recess concentrically arranged within said zone, and four annular segments removably positioned in said recess end to end to completely fill said recess, each of said segments subtending a different angle and having marks thereon dividing the clock-face into minutes, said lower sheet having apertures extending therethrough to said recess with each aperture positioned beneath one of said segments to facilitate pushing said segments out of said recess.

2. A toy according to claim 1, wherein said upper sheet has a plurality of recesses within said annular zone, each equidistantly spaced from an adjacent recess, and including a member in each of said recesses removably positioned therein, said members being referenced to the hour hand of a clock on one side thereof and being referenced to the minute hand of a clock on the opposite side thereof.

3. A toy according to claim 2, wherein eleven recesses are provided at the one o'clock to eleven o'clock positions of the clock-face, respectively, and the twelve o'clock position has the numeral twelve thereon, and said members having numerals from one to eleven on said side thereof reference to the hour hand of a clock.

4. A toy according to claim 3, wherein said board has an hour hand and a minute hand mounted for rotative movement at the center of the clock-face with the minute hand extending at least partially across said segments.

5. An educational toy comprising a board having an annular zone simulating a clock-face and having an annular recess in its upper surface concentrically arranged within said zone, and four annular segments removably positioned in said recess end to end to normally completely fill said recess, said segments dividing the clock-face into five, ten, fifteen and thirty minute sections, respectively.

6. An educational toy comprising a board formed of an upper sheet and a lower sheet secured to each other, said upper sheet having an annular zone simulating a clock-face provided with a plurality of openings each spaced equidistantly from an adjacent opening and having a circular opening concentrically arranged within said zone; a member in each of said plurality of recesses removably positioned therein, said members being referenced to the hour hand of a clock on one side thereof and being referenced to the minute hand of a clock on the opposite side thereof; a circular disc secured to said lower sheet and centrally disposed within said circular opening to provide an annular recess; an hour hand and a minute hand rotatively mounted at the center of said disc; and four annular segment members removably positioned in said annular recess end to end to normally completely fill said recess, said segments being of a length to divide the clock-face into five, ten, fifteen and thirty minute sections, respectively; said lower sheet having an aperture facing each of said members.

References Cited in the file of this patent

UNITED STATES PATENTS

| | | |
|---|---|---|
| D. 146,757 | Webb | May 6, 1947 |
| 802,807 | Fitch | Oct. 24, 1905 |
| 1,245,475 | Lindheim | Nov. 6, 1917 |
| 1,276,344 | Gilman | Aug. 20, 1918 |
| 1,356,929 | Lewers | Oct. 26, 1920 |
| 2,514,636 | Glaze | July 11, 1950 |
| 2,611,193 | Davis | Sept. 23, 1952 |

FOREIGN PATENTS

| | | |
|---|---|---|
| 17,281 | Great Britain | May 18, 1916 |
| 599,038 | Great Britain | Mar. 3, 1948 |